United States Patent [19]

Frykhult et al.

[11] 3,959,150

[45] May 25, 1976

[54] CYCLONE SEPARATOR ASSEMBLY

[75] Inventors: Rune Helmer Frykhult, Johanneshov; Bo Knut Ek, Enskede, both of Sweden

[73] Assignee: AB Celleco, Tumba, Sweden

[22] Filed: Mar. 5, 1974

[21] Appl. No.: 448,215

[30] Foreign Application Priority Data

Mar. 5, 1973 Sweden ............................ 73030108

[52] U.S. Cl. ............................ 210/512 M; 209/211

[51] Int. Cl.² ............................ B01D 21/36

[58] Field of Search ........... 210/232, 236, 253, 322, 210/512, 512 M; 209/144, 211; 55/349

[56] References Cited

UNITED STATES PATENTS

| | | | |
|---|---|---|---|
| 2,622,735 | 12/1952 | Criner | 209/211 |
| 3,057,476 | 10/1962 | Gilbert | 209/211 |
| 3,335,860 | 8/1967 | Baxter | 209/211 |
| 3,543,931 | 12/1970 | Rastatter | 210/512 M |

FOREIGN PATENTS OR APPLICATIONS

| | | | |
|---|---|---|---|
| 817,342 | 7/1959 | United Kingdom | 209/211 |

*Primary Examiner*—Charles N. Hart
*Assistant Examiner*—Ernest G. Therkorn
*Attorney, Agent, or Firm*—Cyrus S. Hapgood

[57] ABSTRACT

Conduits are provided for supplying a fluid to each cyclone separator and discharging separated fluids therefrom; and the conduits are connected to the separator by means comprising a tube on each conduit mating with a tube on the separator, each pair of mating tubes being arranged one within the other and at least two of the tubes on the separator being disposed generally at right angles to each other.

3 Claims, 5 Drawing Figures

CYCLONE SEPARATOR ASSEMBLY

Figure 1:
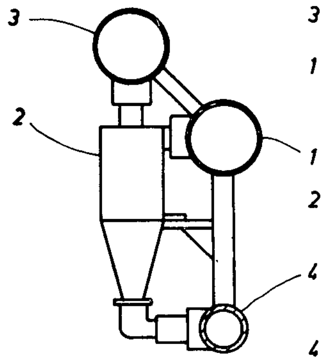

The present invention relates to a cyclone separator assembly provided with means by which each separator is adapted to be connected to tube conduits for supplying fluids to the separator and draining fluids therefrom. Each separator is characterized in that said connection means comprise tubular members adapted to be interconnected with corresponding openings or tubular members on the conduits by fitting the tubular members of each mating pair one into the other, at least two of the tubular members of the cyclone separator being disposed generally perpendicularly relative to each other.

Cyclone separators have gained an ever increasing use in industry for different purposes. For example, cyclone separators are used to a large extent in the cellulose and paper industry for purifying suspensions of cellulose fibers in water. While the capacity of the individual plants has gradually increased, the dimensions of the cyclone separators used therein have decreased gradually owing to the fact that the small cyclone separators have greater separating capability than larger ones and require less energy for the same separating operation. This has lead to a heavy increase in the number of cyclone separators in the plants. It can be mentioned as an example that in the cellulose industry, thousands of cyclone separators are often used in the same plant.

The conventional method of connecting the individual cyclone separators to inlet and outlet conduits is by means of hoses and hose clips which are slipped onto connecting sockets on the cyclone separators and the conduits. Because of the large number of cyclone separators, such devices become bulky and also costly and unaesthetical. In addition, the hose connections are unhandy and time consuming when the cyclone separators are to be dismantled for cleaning or replacement. Also, it often happens that the hoses break, and especially at high operating temperatures such damages have caused burning injuries to personnel standing nearby. Attempts have been made to solve these problems by packing the cyclone separators in containers, as appears, for example, from Swedish Pat. No. 181,191, this method being used to a large extent nowadays. However, this method has resulted in other disadvantages. For example, a number of pockets are formed in the resulting construction which creates a risk of funtional trouble, especially in connection with treating cellulose fiber suspensions. Also, such a construction is relatively expensive.

The present invention eliminates the above-mentioned drawbacks and allows an unlimited number of cyclone separators to be connected to common conduits for supplying a fluid to be treated in the cyclone separators and draining off separated fractions from the cyclone separators without using hoses and hose clips. Thus, such a cyclone separator plant is particularly compact and also cheaper to manufacture, because it is now possible to simplify the stand supporting the same. The risk of injuring personnel is eliminated to a great extent because there are no hoses that can break. The invention also has the advantage that individual cyclone separators, by a few simple manipulations, can be dismantled for cleaning and mounted again and possibly replaced when worn out. Moreover, plants according to the invention do not develop harmful pockets which could cause functional trouble.

Figure 2:
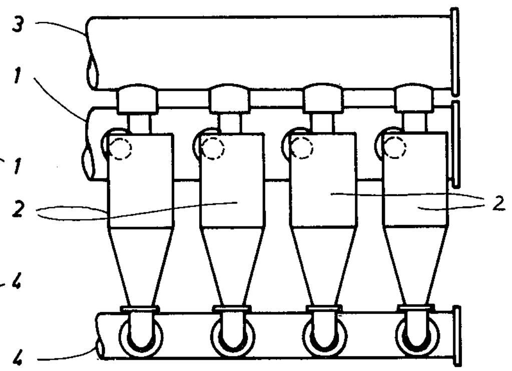
Figure 3:
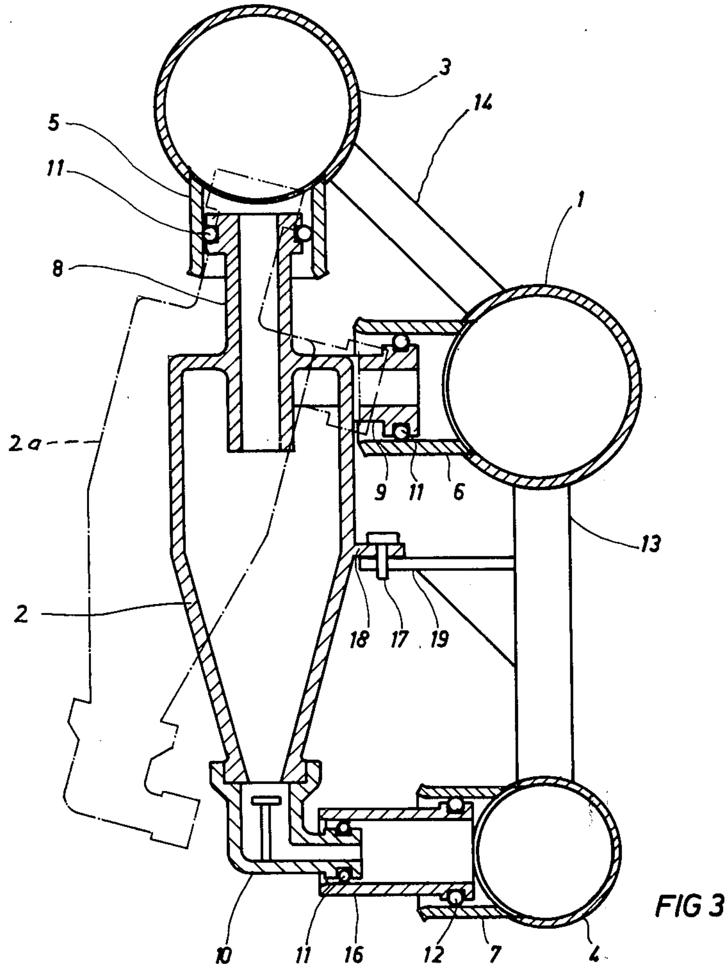
Figure 5:
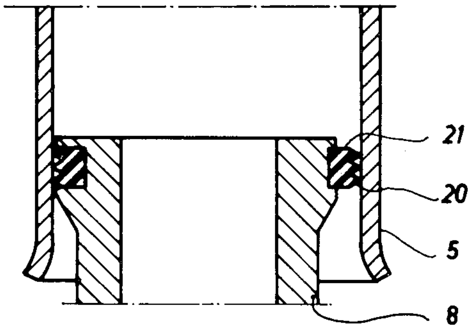
Figure 4:
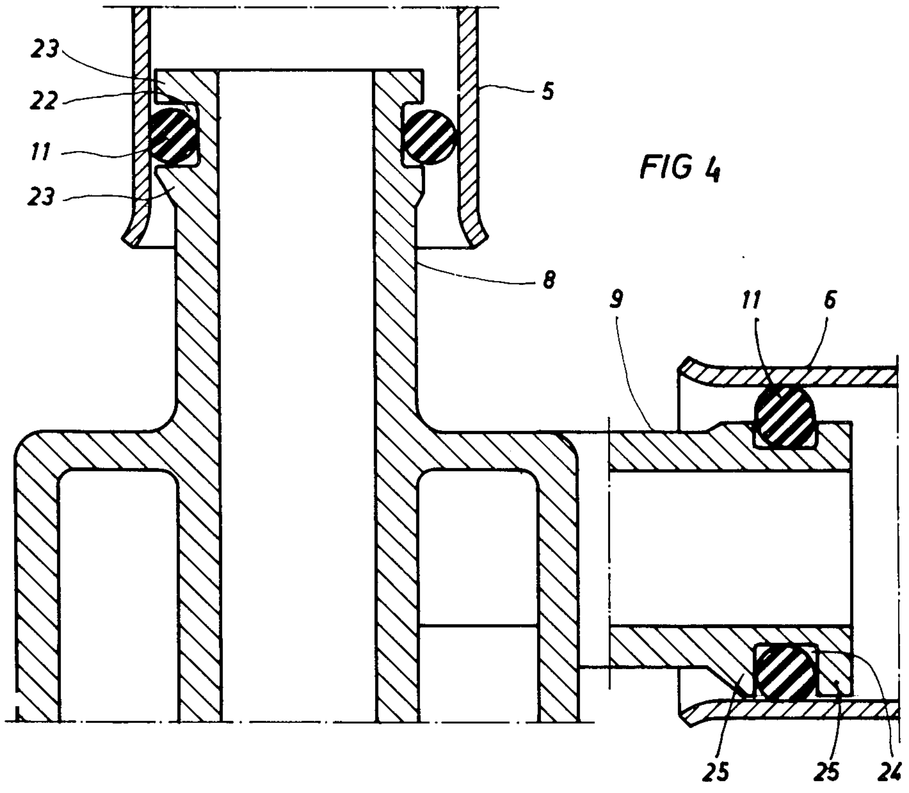

The invention will be described in more detail below with reference to the accompanying drawings which illustrate an example of a cyclone separator plant in the cellulose industry. In the drawings, FIG. 1 is a side elevation of a series of cyclone separators disposed behind each other and connected to common supply and drain conduits; FIG. 2 shows a small part of such a series of cyclone separators in front elevation; FIG. 3 is an enlarged sectional view of the arrangement according to FIG. 1; FIG. 4 is a still more enlarged section of the upper portion of a cyclone separator having a top outlet for light fraction and a tangential inlet, this figure showing essential details of a sealing member used in connection with the invention, and FIG. 5 is a sectional view of another sealing member disposed at the light fraction outlet.

In the drawings, a conduit 1 is provided for a cellulose fiber suspension in water which is to be distributed to a large number of cyclone separators 2. Shown at 3 is a conduit common to the separators for draining off a purified fiber suspension, and a conduit 4 common to the separators serves for draining off a suspension of separated impurities.

The conduits as well as the separators are provided with connection devices which, as shown in FIG. 3, comprise tubular members 5, 6 and 7 on the three conduits and corresponding tubular members 8, 9 and 10 on each cyclone separator. As is apparent from the drawings, the tubular members are dimensioned to be inserted one in the other. Further, a sealing member 11 is adapted to shut off an annular clearance formed between the tubular members of each mating pair when inserted one in the other.

The manifold conduits 1, 3 and 4 are rigidly interconnected by means of struts 13 and 14 (FIG. 3) and thereby form a simple rack. The cyclone separator 2*a* shown in dash-dotted lines in FIG. 3 is in the starting position of such a separator when it is to be connected to the conduits 3, 1 and 4. The light fraction tubular member 8 with its sealing member 11 has been inserted into the connecting tubular member 5 of the conduit 3. Because the tubular member 5 has an essentially larger inner diameter than the outer diameter of the tubular member 8, the cyclone separator 2*a* can easily be rotated in the plane of the paper. When the separator is rotated from the position shown in dash-dotted lines to the vertical position shown in full lines at 2, the inlet tubular member 9 can be inserted into the tubular member 6 of the supply conduit 1, and at the same time the tubular member 10 can be inserted into a tubular member on the outlet conduit 4, because the tubular member 10 is bent angularly and the free end thereof extends parallel to the tubular member 9. To make this possible, the tubular members 9 and 6 also have such dimensions that an annular clearance is formed therebetween when inserted one into the other.

In the embodiment shown in FIG. 3, the tubular member 10 has been connected to the conduit 4 by means of an intermediate member 16 in order to facilitate the mounting. It could happen that irregularities occur, for example as regards the distances between the tubular members 5, 6 and 7. Such irregularities are compensated for by means of the intermediate member 16. This member is a sleeve which is adapted to be inserted at one of its ends with the sealing member 12 into the tubular member 7 and to receive at its other end the end portion of the tubular member 10 with its sealing member 11. The tubular member 10 is thus inserted into one end of the intermediate member 16, and the other end there of is inserted into the tubular member 7. After the cyclone separator has been connected to the conduits 1, 3 and 4 in the above-mentioned manner, it is releasably secured in its operating position by means of a pin or bolt 17 which connects a protrusion 18 of the cyclone separator to a corresponding protrusion 19 extending from the strut 13.

In the embodiment shown in FIGS. 3 and 4, each sealing member 11 is an O-ring gasket. In FIG. 5 an alternative sealing member is shown which comprises a number of circumferential ribs 20 on an annular rubber element 21. The O-ring gaskets 11 as well as the rubber element 21 could instead be provided in the tubular members 5, 6 and 7 as well as in the intermediate member 16. Furthermore, ribs 20 can be made integral with the tubular members 8, 9 and 10, for example, if these are made of a plastic or resilient material. In such case the sealing member as a whole can be of the same material as the cyclone separator and made integral therewith. On the other hand, the sealing members could comprise an external or internal bead on each of the tubular members 5, 6 and 7 adapted to seal against the outside or inside of a tubular member or the inside of a passage in the cyclone separator, if the latter is made of a plastic or resilient material.

The intermediate member 16 of the embodiment shown in FIG. 3 is preferably made of a transparent material. It often happens that the outlet in the tubular member 10 becomes plugged because the fraction leaving therethrough is often viscous and contains relatively large particles. This can easily be observed, because the flow through the intermediate member 16 will then cease.

The internal pressure in the supply conduit 1 can be considerable. Even at a comparatively moderate pressure such as 3 kp/cm$^2$ (43 psi), a force of 130 kp (287 lbf) occurs which is directed to the left and acts on the cyclone separator in FIG. 3. This results in a corresponding radial loading on the left-hand side of the sealing member 11 of the tubular member 8, which would sooner or later compress the sealing member against the tubular member 5, whereby a leakage would occur at the right-hand side of the sealing member.

FIG. 4 shows an arrangement by which the radial force thus occurring on the left-hand side of the sealing member 11 is relieved. The tubular member 8 has a groove 22 which is eccentric relative to the tubular member 8, in that the groove 22 is displaced to the right in FIG. 4. As a result, the flanges 23 will protrude across the sealing member 11 farther on the left-hand side than on the right-hand side. Influenced by the radial pressure, the flanges 23 will engage the inside of the tubular member 5 at its left-hand side after the sealing member 11 has been compressed sufficiently to provide for sealing engagement on that side. The same result is achieved if the flanges 23 are made eccentric with relation to the tubular member 8 by being displaced to the left. Both said steps have been taken in the embodiment according to FIG. 4, whereby a strengthened device for relieving the sealing member is obtained. Corresponding means and arrangement could, of course, be provided within the tubular member 5, for example.

In the conduit 3 there is also a certain overpressure resulting in an axially directed force pressing the cyclone separator downwards. Thus, a radial force is created on the lower side of the sealing member 11 between the tubular member 9 and the socket 6. Therefore, the sealing member 11 of the tubular member 6 is disposed in an eccentric groove 24 in a corresponding manner, this groove being displaced upward relative to the axis of tubular member 9. Also, the flanges 25 are eccentric and displaced downwards.

We claim:

1. In combination with a plurality of cyclone separators, a manifold conduit for supplying fluid to the separators, and two additional manifold conduits for discharging separated fluids from the separators, means for releasably connecting each cyclone separator to said manifold conduits and including three tubular members on the separator, said means also including a tubular member on each of said conduits, each separator having an operating position in which a said tubular member on each of said conduits mates with one of said tubular members on the separator to form a pair of telescoping members extending lengthwise in substantially parallel relation one within the other, at least two of said tubular members on the separator being disposed generally perpendicularly relative to each other, one of said two tubular members forming with its mating member on the corresponding conduit an annular clearance space, an annular sealing member positioned in said annular space for accommodating tilting of the separator from its said operating position to move the other of said two tubular members away from its mating member on the corresponding conduit, and means for releasably securing each separator in its said operating position.

2. The combination of claim 1, in which each said pair of mating tubular members forms an annular space between the members, said connecting means comprising also an annular sealing member in each of said annular spaces, and means for taking up forces acting radially between a pair of mating tube members to limit compression of the corresponding sealing member.

3. The combination of claim 2, in which said means for taking up forces comprise supporting flanges eccentrically disposed relative to the corresponding sealing member.

* * * * *